(12) United States Patent
Admani et al.

(10) Patent No.: US 11,254,451 B2
(45) Date of Patent: Feb. 22, 2022

(54) PRE-DEPLOYMENT BATTERY POWER CONSERVATION FOR SPACECRAFT

(71) Applicant: Space Exploration Technologies Corp., Hawthorne, CA (US)

(72) Inventors: Mohammed Faraz Admani, Redmond, WA (US); Pieter Buysschaert, Kirkland, WA (US); Andrew D. Roberts, Duvall, WA (US); Garrett P. Simard, Seattle, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 92 days.

(21) Appl. No.: 15/930,415

(22) Filed: May 12, 2020

(65) Prior Publication Data

US 2020/0361637 A1 Nov. 19, 2020

Related U.S. Application Data

(60) Provisional application No. 62/847,750, filed on May 14, 2019.

(51) Int. Cl.
*B64G 1/42* (2006.01)
*B64G 1/00* (2006.01)
*B64G 1/66* (2006.01)

(52) U.S. Cl.
CPC .............. *B64G 1/428* (2013.01); *B64G 1/002* (2013.01); *B64G 1/66* (2013.01)

(58) Field of Classification Search
CPC .......... B64G 1/428; B64G 1/002; B64G 1/66; B64G 1/641
See application file for complete search history.

(56) References Cited

U.S. PATENT DOCUMENTS

2016/0265477 A1* 9/2016 Smith .................... B64G 1/402
2019/0077524 A1* 3/2019 Faber .................... B64G 1/222

* cited by examiner

*Primary Examiner* — Valentina Xavier
(74) *Attorney, Agent, or Firm* — Polsinelli PC

(57) ABSTRACT

Embodiments of the present disclosure are directed to techniques for autonomously transitioning a spacecraft from a power-saving state to a power-consuming state at a time after launch of the spacecraft on a launch vehicle. Because the spacecraft can autonomously detect conditions for transitioning to the power-consuming state, commands received via an umbilical connection to the launch vehicle, or detecting the presence or absence of such a connection, is unnecessary, thereby removing several technical barriers to eliminating such umbilical connections altogether. In some embodiments, low-cost vacuum detection devices that use very small amounts of power may be used by the spacecraft to detect when the spacecraft has reached an altitude suitable for transitioning to the power-consuming state.

19 Claims, 4 Drawing Sheets

PRE-DEPLOYMENT BATTERY POWER CONSERVATION FOR SPACECRAFT

CROSS-REFERENCE TO RELATED APPLICATION

This application claims the benefit of U.S. Provisional Application No. 62/847,750, filed May 14, 2019, the disclosure of which is hereby incorporated by reference herein in its entirety.

BACKGROUND

Spacecraft being launched into space, including spacecraft such as satellites, typically have an umbilical connection to a launch vehicle. Independent umbilical connections from the launch vehicle to each satellite being carried by the launch vehicle can provide power, data, commands, and situational awareness from the launch vehicle to the satellite. Detachment of the umbilical connection, which may typically occur through the use of explosive bolts or other similar techniques, may be detected by the satellites as an indication that the satellite has been deployed from the launch vehicle and is in independent flight. This indication may be used by the satellite to transition from a power-saving storage and launch mode to a powered-on flight mode, if an explicit command to make the transition had not been transmitted via the umbilical connection.

In a launch of multiple satellites from a single launch vehicle, an umbilical connection to the launch vehicle for each individual satellite becomes detrimental to the launch for multiple reasons. For example, each umbilical connection adds expense and complexity to the launch system as a whole. Further, multiple umbilical connections risk interference with each other, particularly as the number of satellites launched by a single launch vehicle increases.

However, eliminating the umbilical connection between the launch vehicle and the satellite is difficult. With no umbilical connection, the satellite must rely on battery power for operation until a solar array (or other power generation device) can be deployed. Hence, it would be desirable to leave the satellite in a low power-consumption state until deployment from the launch vehicle, particularly because an amount of time between charging the satellite and deployment of the satellite, which might include tasks such as long-term storage after production, delivering the satellite to the launch vehicle assembly location, fueling the launch vehicle, erecting the launch vehicle, and the launch process itself, might be long enough to completely drain the battery if the satellite were not in a low power-consumption state. Unfortunately, because the detachment of the umbilical connection is traditionally used to detect deployment, removal of the umbilical connection makes it difficult to keep the satellites in the power-saving state until deployment. There exists a need for an alternate system to keep the satellites in the power-saving state until deployment. Embodiments of the present disclosure are directed to solving these problems, as well as other problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a spacecraft is provided. The spacecraft comprises one or more power-consuming systems, one or more sensors, and a monitoring device. The monitoring device is configured to activate the one or more power-consuming systems based on signals received from the one or more sensors.

In some embodiments, a method for autonomously activating power-consuming systems of a spacecraft is provided. A monitoring device of the spacecraft receives at least one signal from at least one sensor of the spacecraft. The monitoring device determines whether the at least one signal indicates an activation condition. In response to determining that the at least one signal indicates an activation condition, the monitoring device activates the power-consuming systems. In some embodiments, a monitoring device for a spacecraft that is configured to perform such a method is provided.

In some embodiments, a method of launching a spacecraft into orbit is provided. The spacecraft is loaded onto a launch vehicle with one or more power-consuming devices of the spacecraft in an inactive state, and the launch vehicle is launched. The spacecraft detects a condition for activating the power-consuming devices. The spacecraft activates the one or more power-consuming devices. The spacecraft is released from the launch vehicle.

In some embodiments, a spacecraft launch system is provided. The spacecraft launch system comprises a launch vehicle and at least one spacecraft removably attached to the launch vehicle. The at least one spacecraft is not electrically coupled to the launch vehicle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present disclosure are directed to techniques for autonomously transitioning a spacecraft from a power-saving state to a power-consuming state at a time after launch of the spacecraft on a launch vehicle. Because the spacecraft can autonomously detect conditions for transitioning to the power-consuming state, commands received via an umbilical connection to the launch vehicle, or detecting the presence or absence of such a connection, is unnecessary, thereby removing several technical barriers to eliminating such umbilical connections altogether. In some embodiments, low-cost vacuum detection devices that use very small amounts of power may be used by the spacecraft to detect when the spacecraft has reached an altitude suitable for transitioning to the power-consuming state.

Figure 1:
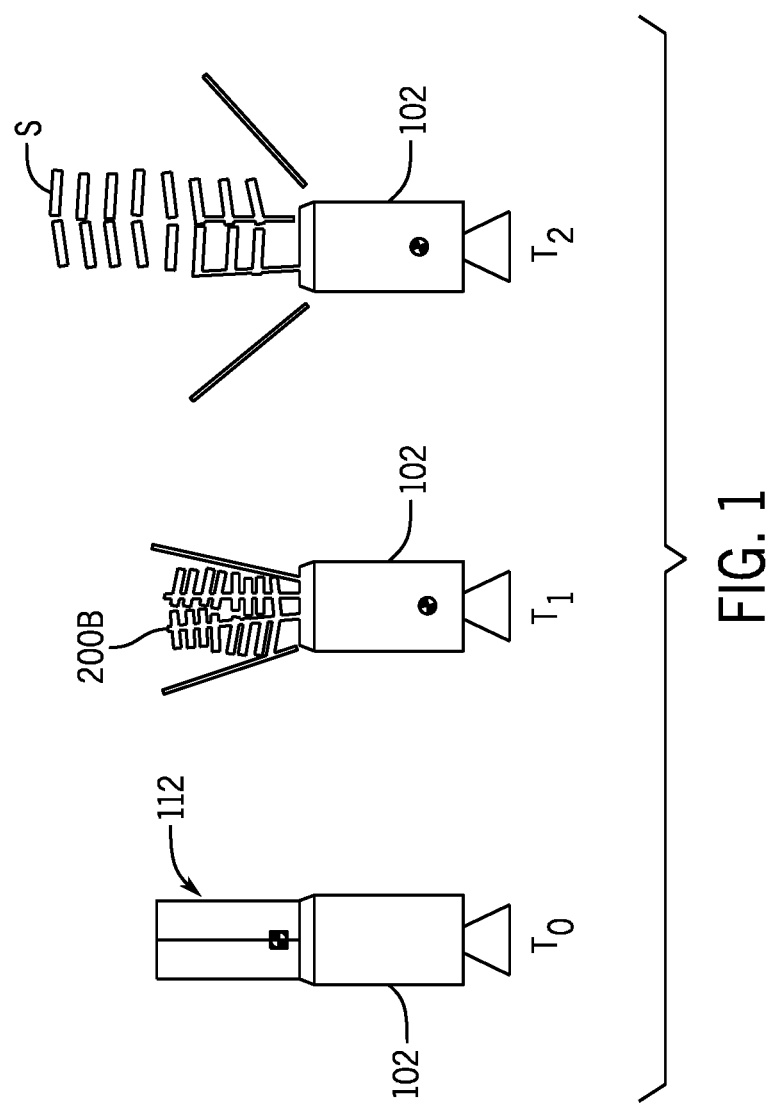
FIG. 1 is an illustration of a non-limiting example embodiment of a process for deploying satellites from a launch vehicle.

FIG. 1 is a not-to-scale illustration of a process for deploying spacecrafts from a launch vehicle. Specifically, FIG. 1 illustrates a launch vehicle 102 that deploys a plurality of satellites S. In a non-limiting example, each of the satellites S may be a communication satellite designed for participating in a low Earth orbit (LEO) constellation for providing Internet connectivity to ground-based users. In another non-limiting example, the launch vehicle 102 may include and/or represent a multistage rocket. A multi-stage rocket may include a plurality of engine stages that separate and ignite in sequence at various times during launch. In FIG. 1, the launch vehicle 102 represents the second engine stage of a two-stage rocket after the second engine stage has separated from the first engine stage. The launch vehicle 102 may include any number of stages, including a single stage.

The satellites S may be contained within a spacecraft system 112 of the launch vehicle 102. The satellites S may be arranged or secured within the spacecraft system 112 in any suitable manner or configuration, such as a stacked configuration. In the stacked configuration, the satellites S may be layered on top of each other. The launch vehicle 102 may include any number of layered stacks of satellites. In some cases, the satellites S may be releasably secured to the spacecraft system 112 (e.g., to a payload adapter of the spacecraft system 112). In addition, the satellites S may be releasably secured to each other. In one example, the satellites S may be releasably secured to the spacecraft system 112 and/or to each other via a structure that runs along the length of the satellite stack(s). Upon reaching a deployment location, the structure may release the satellites S from the spacecraft system 112, and the satellites S may be deployed into orbit. Deploying the satellites may occur passively (e.g., without the use of a dedicated deployment system). Notably, the satellites S may not be secured to the spacecraft system 112 via a connection mechanism (such as an umbilical connection) that facilitates communication between the launch vehicle 102 and the satellites S during deployment.

At a time T0 illustrated in FIG. 1, the launch vehicle 102 has reached (or is imminently approaching) a deployment location for deploying the satellites S. This deployment location may be at or nearby an intended orbital plane or orbital path of the satellites S. At time T0, the launch vehicle 102 may begin (or may have previously begun) to rotate about its center of mass. In one example, thrusters of the launch vehicle 102 may induce steady state rotation of the launch vehicle 102 in the yaw direction (e.g., rotation around the nadir axis of the spacecraft 202). At a time T1 illustrated in FIG. 1, the spacecraft system 112 releases the satellites S for deployment. For instance, a portion of the spacecraft system 112 may open or otherwise expose the satellites S to space. The structure that secures the satellites S releases the satellites S, and the satellites begin to dispense towards their intended orbital positions. At a time T2 illustrated in FIG. 1, the satellites S continue to move into orbit. As the satellites S move, the satellites S separate from each other (e.g., spread out). In some cases, this separation may occur due to rotation of the launch vehicle 102. For instance, the linear speed of an individual satellite as it is released from a stack of satellites correlates to the distance between the satellite and the center of mass of the launch vehicle 102. Thus, satellites positioned at various distances from the center of mass of the spacecraft 202 will be deployed into orbit at various speeds, resulting in a natural passive separation and spreading out of the satellites S.

Once deployed, a satellite may operate one or more power-consuming systems, such as a communication system (e.g., a phased array antenna system), a flight computer system, and a solar array actuator system, among others. In some cases, these systems may be powered by one or more solar arrays coupled to the satellite. However, upon deployment of the satellite, the solar arrays may not be in a configuration suitable for absorbing and transmitting solar energy. For instance, to accommodate the stacked configuration of a group of satellites, solar arrays of the satellites may be stowed prior to deployment. Some traditional satellite systems may provide power to the power-consuming systems upon deployment via a direct connection (e.g., an umbilical connection) between a satellite and a launch vehicle. This direct connection may also facilitate turning on (e.g., activating) the power-consuming systems. For instance, the power-consuming systems may become activated in response to a command provided via the direct connection, or in response to the direct connection detaching from the satellite.

However, as noted above, embodiments of the present disclosure may not utilize umbilical connections or other types of direct connections between satellites and launch vehicles (which may reduce the cost of the launch vehicle, as well as lower the risk of deployment errors). If a satellite does not include a direct connection to a launch vehicle, one or more charge-storing devices (e.g., batteries) may be used to provide power to the power-consuming systems of the satellite before a solar array becomes operational (e.g., deployed from its stowed configuration). To avoid draining the charge-storing devices, the power-consuming systems may operate in a power-saving (e.g., powered-down) state prior to deployment. At or near the time of deployment, the power-consuming systems may begin operating in a power-consuming (e.g., powered-on) state. Without a direct connection between the satellite and the launch vehicle, the launch vehicle may be unable to instruct the power-consuming systems to enter the powered-on state. Thus, the present disclosure describes systems and methods for detecting when the power-consuming systems of a satellite are to be switched from the powered-down state to the powered-on state.

Figure 2:
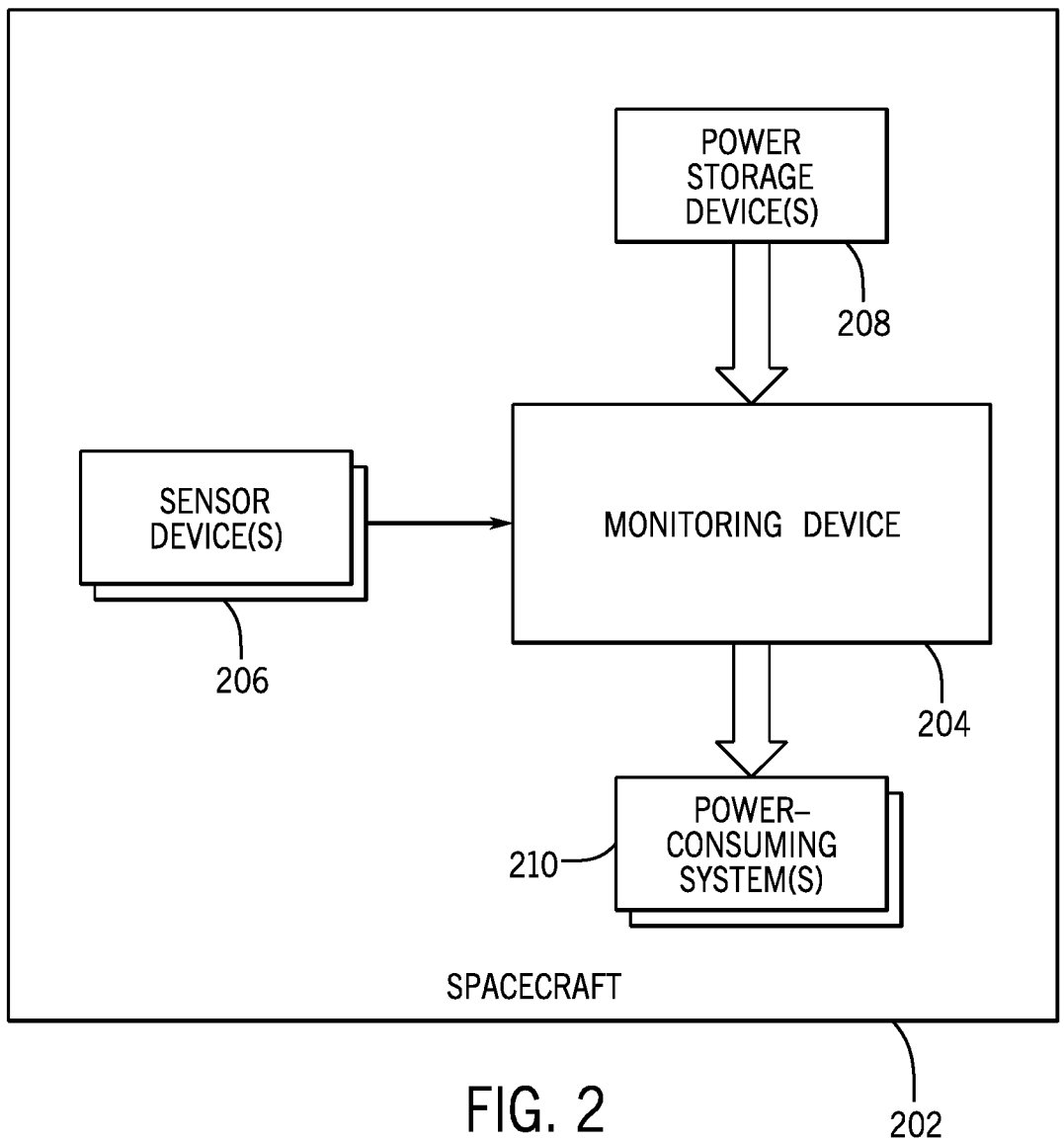
FIG. 2 is a block diagram that illustrates a non-limiting example embodiment of a spacecraft according to various aspects of the present disclosure.

FIG. 2 is a block diagram that illustrates a non-limiting example embodiment of a spacecraft according to various aspects of the present disclosure. The spacecraft 202 may be any type of spacecraft that is carried to space on a launch vehicle while in a power-saving state, and that is transitioned to a power-consuming state after launch. In one non-limiting example, the spacecraft 202 may represent one of the satellites S illustrated in FIG. 1.

As shown, the spacecraft 202 includes one or more power storage devices 208, one or more sensor devices 206, one or more power-consuming systems 210, and a monitoring device 204. In some embodiments, the power storage devices 208 may include one or more charge-storing devices (e.g., batteries) that can be charged on the ground before the spacecraft 202 is launched. The power storage devices 208 may then provide power to the sensor devices 206 and/or the monitoring device 204 during and/or after launch. In some cases, the power storage devices 208 may also provide power to the power-consuming systems 210 before a solar array or other power-generating component of the spacecraft 202 can be deployed.

In some embodiments, the power storage devices 208 may include a primary (e.g., main) power storage device 208 configured to provide power to the power-consuming systems 210, as well as one or more secondary (e.g., auxiliary)

power storage devices 208 configured to provide power to sensor devices 206 and/or the monitoring device 204. In this example, the primary power storage device 208 may be switched on when the power-consuming systems 210 are to enter the powered-on state. In other words, the primary power storage device 208 may begin providing power to the power-consuming systems 210 once the sensor devices 206 and/or the monitoring device 204 detect that the spacecraft 202 has been deployed from a launch vehicle. In some cases, the primary storage device 208 and the secondary power storage device 208 may be different types of power storage devices, for example, based on the different power needs of the sensor devices 206 and the power-consuming systems 210. For instance, the sensor devices 206 may require a significantly smaller amount of power than the power-consuming systems 210 and, therefore, the secondary power storage device 208 may be configured to provide a smaller amount of power than the primary power storage device 208. In one non-limiting exemplary embodiment, the secondary power storage device 208 may be a small cell battery and the primary power storage device 208 may be a larger battery and/or a battery of a different chemistry. However, the primary power storage device 208 and the secondary power storage device 208 may be the same type of power storage device, or a single power storage device.

The power-consuming systems 210 may include a communication system (e.g., a phased array antenna system), a flight computer, actuators for the solar array, or other systems that consume large amounts of power while in a powered-up or active state. While the power-consuming systems 210 may be important or critical for some operations of the spacecraft 202, the power-consuming systems 210 may not be necessary for launch and/or deployment of the spacecraft 202. Thus, the power-consuming systems 210 may be placed in a powered-down or inactive state during launch and/or deployment.

As used herein, a "powered-down" or "inactive" state can refer to a mode of operation in which a system has no or reduced functionality due to the system receiving no or a small amount of power. In contrast, a "powered-up" or "active" state can refer to a mode of operation in which a system has full (or at least partial) functionality due to the system receiving a high or sufficient amount of power. The monitoring device 204 may be configured to determine when the power-consuming systems 210 should be switched from a powered-down state to a powered-on state. In some embodiments, the monitoring device 204 may make this determination based on receiving and analyzing signals from the sensor devices 206. In particular, the monitoring device 204 may determine when signals received from the sensor devices 206 indicate that the spacecraft 202 has reached an altitude at which spacecraft 202 is deployed (or is nearing deployment) from a launch vehicle. In one embodiment, this altitude may correspond to the spacecraft 202 leaving the atmosphere, such as an altitude of 120 kilometers. Once this altitude is reached, all or a portion of the power-consuming systems 210 may become necessary for proper operation of the spacecraft 202 (or may soon become necessary).

In some embodiments, the monitoring device 204 includes or is a watchdog device. As used herein, a "watchdog device" may refer to a device or set of devices that monitor a system to detect and prevent failures. In one embodiment, the monitoring device 204 may include a watchdog device that prevents the failure of activating the power-consuming systems 210 before the power-consuming systems 210 are needed for proper operation of the spacecraft 202 (thereby preventing unnecessary power consumption by the power-consuming systems 210). Additionally or alternatively, the monitoring device 204 can be separate from a watchdog device. For instance, the monitoring device 204 can receive and process signals from a watchdog device. In some embodiments, the monitoring device 204 consumes power from the power storage device 208, but the amount of power consumed is so small that it does not result in a significant drain on the power storage device 208 between the time of charging and deployment of the spacecraft 202.

The sensor devices 206 are any type of device that can detect criteria and/or conditions that indicate the power-consuming systems 210 should be activated (e.g., due to the spacecraft 202 being deployed or approaching deployment). In some cases, the sensor devices 206 may include one or more environmental sensor devices that detect environmental conditions associated with the spacecraft 202 being deployed. Other types of sensor devices 206 may be used to determine when the power-consuming systems 210 should be activated, such as sensor devices 206 configured to detect wireless signals, sensor devices 206 configured to determine the proximity between the spacecraft 202 and other spacecraft and/or launch vehicles, among others.

One example of a sensor device 206 is a vacuum detection device configured to detect when the spacecraft 202 has left the atmosphere, or has otherwise achieved a high enough altitude to indicate that it is nearing the point where it will be deployed from the launch vehicle. In this example, the vacuum detection device may output a signal whose voltage level correlates with the air pressure surrounding the spacecraft 202. Thus, this sensor device 206 may represent an environmental sensor device. In some cases, the vacuum detection device may output a signal with one voltage level (e.g., 1 Volt, 5 Volts, etc.) if the ambient air pressure is below a threshold pressure (e.g., one-third of an atmosphere, one-fourth of an atmosphere, etc.), and output a signal with another voltage level (e.g., 0 Volts) if the ambient air pressure exceeds the threshold pressure.

Another example of a sensor device 206 is a contact switch that can detect whether the spacecraft 202 is still in physical contact with a surface (such as a surface of the launch vehicle, or another spacecraft 202 in a stack carried by the launch vehicle). Another example of a sensor device 206 is a vibration sensor that can detect whether the spacecraft 202 and/or the launch vehicle is experiencing vibration forces that indicate passage through the atmosphere, or that indicate that an engine of the launch vehicle has stopped thrusting. Another example of a sensor device 206 is a wireless communication sensor that can detect whether a wireless activation signal is being transmitted by the launch vehicle (or by another spacecraft carried by the launch vehicle). Another example of a sensor device 206 is an optical sensor that can detect whether a fairing that encloses the spacecraft 202 within the launch vehicle has been separated. Another example of a sensor device 206 is a spacecraft-to-spacecraft connectivity sensor. The spacecraft-to-spacecraft connectivity sensor may detect the presence or absence of a current that is passed through the framework of the spacecraft by the spacecraft themselves or by the launch vehicle. Once the spacecraft are deployed, the current will no longer be present, and the spacecraft-to-spacecraft connectivity sensor will detect the deployment.

The spacecraft 202 may include any one or more of the sensor devices 206 described above, as well as any additional type of sensor device. In some embodiments, the monitoring device 204 may determine whether signals from multiple sensor devices of the spacecraft 202 collectively indicate that conditions exist for activating the power-consuming systems 210. For instance, the monitoring device 204 may check whether all of the signals (e.g., signals from each of the sensor devices 206) indicate that conditions exist for activating the power-consuming systems 210 before determining that the power-consuming systems 210 should be activated. However, this may result in failure if one or more of the sensor devices 206 failed or otherwise provided incorrect signals. Accordingly, in some embodiments, the monitoring device 204 may check whether a threshold number of the signals indicate that conditions exist for activating the power-consuming systems 210. For example, the monitoring device 204 may check whether a majority of the signals indicate that the conditions exist, whether at least one or more than one of the signals indicate that the conditions exist, or any other suitable threshold number. As a specific example, three sensor devices 206 may be present, and the monitoring device 204 may determine whether signals from at least two out of the three sensor devices 206 indicate that the conditions exist.

In some embodiments, the monitoring device 204 may determine that signals from the sensor devices 206 indicate that one or a portion of the power-consuming systems 210 should be activated, but that not all of the power-consuming systems 210 should be activated. For instance, the monitoring device 204 may use different criteria to activate different power-consuming systems 210. As an illustrative example, a first power-consuming system 210 may be activated in response to detecting that the launch vehicle has achieved a first altitude, and a second power-consuming system 210 may be activated in response to detecting that the launch vehicle has achieved a second altitude, or that the spacecraft 202 has been deployed from the launch vehicle, or any other suitable condition. Thus, the sensor devices 206 may be configured to detect various altitudes and/or conditions.

Figure 3:
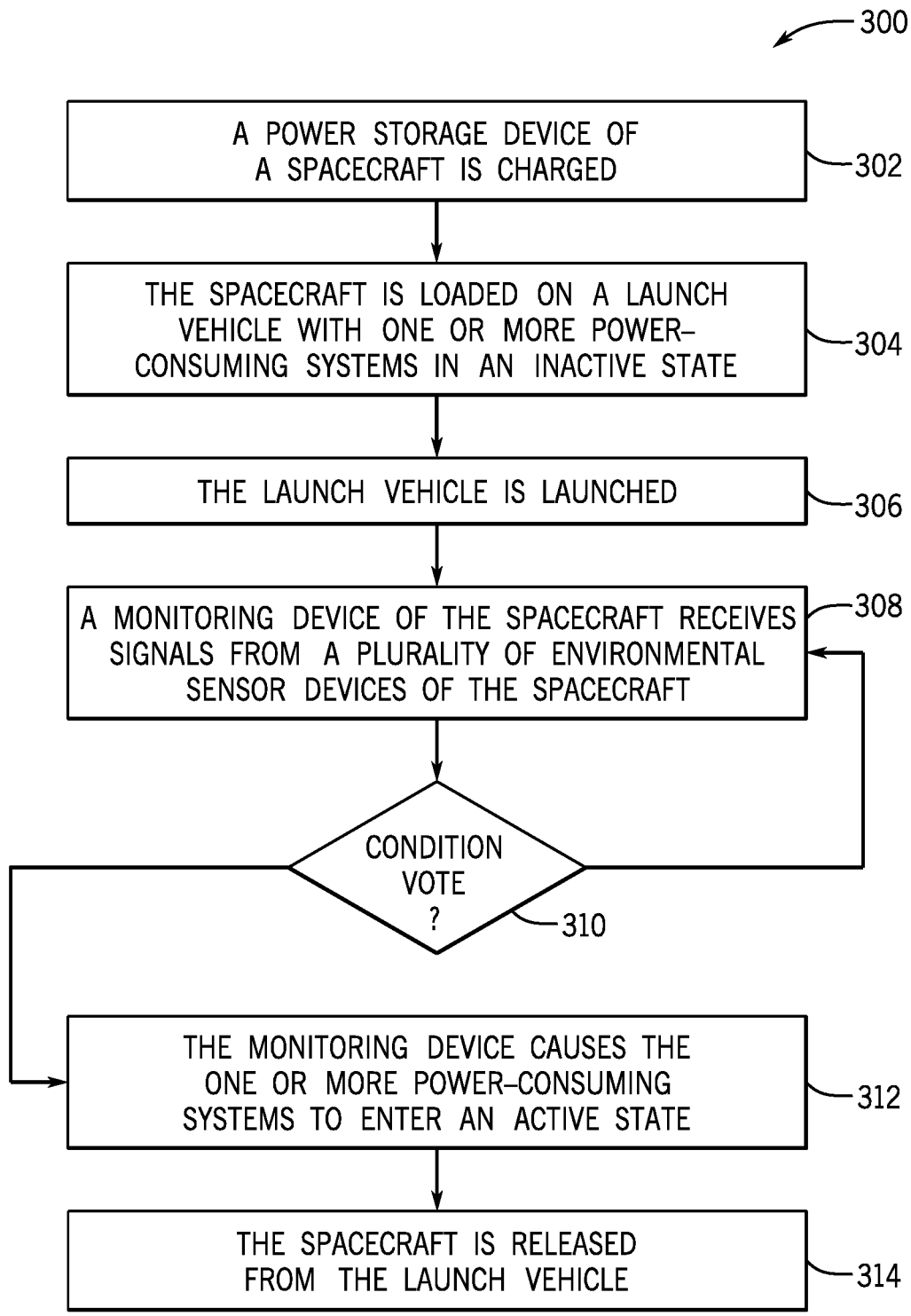
FIG. 3 is a flowchart that illustrates a non-limiting example embodiment of a method for autonomously activating power-consuming systems of a spacecraft according to various aspects of the present disclosure.

FIG. 3 is a flowchart that illustrates a non-limiting example embodiment of a method for autonomously activating power-consuming systems of a spacecraft according to various aspects of the present disclosure. In some embodiments, the method 300 may be implemented by the components of the spacecraft 202 illustrated in FIG. 2. In the method 300, the monitoring device 204 maintains the power-consuming systems 210 in their powered-down or inactive states until signals from the sensor devices 206 indicate that it is appropriate to power-up or activate the power-consuming systems 210. Once appropriate, the monitoring device 204 causes the power-consuming systems 210 to be powered-up or activated.

At block 302, the power storage device 208 of the spacecraft 202 is charged. In some embodiments, this may occur while the spacecraft 202 is in a warehouse, staging area, or other location where the spacecraft 202 is manufactured or prepared for launch. In some embodiments, this may occur by attaching an umbilical connection, a power cable, or other source of power to the spacecraft 202. When disconnected from the source of charging power, the power-consuming systems 210 may be manually or automatically placed in the powered-down or inactive state, and the monitoring device 204 may begin monitoring the signals from the sensor devices 206. The monitoring device 204 may begin monitoring the signals from the sensor devices 206 immediately following the power-consuming systems 210 being placed in the powered-down state, or at a later point in time (such as when the spacecraft 202 is launched).

At block 304, the spacecraft 202 is loaded on a launch vehicle with the power-consuming systems 210 in an inactive state. As stated above, the power-consuming systems 210 of the spacecraft 202 may be placed in the inactive state once disconnected from an external source of power. Loading the spacecraft 202 on the launch vehicle may include any number of techniques, including but not limited to stacking the spacecraft 202 along with other spacecraft, releasably attaching the stack of spacecraft to the launch vehicle, and covering the stack of spacecraft with a fairing. In some embodiments, the spacecraft 202 may also be attached to the launch vehicle with an umbilical connection, though it is noted that embodiments of the present disclosure do not use the umbilical connection for the activation of the power-consuming systems 210 as described herein.

At block 306, the launch vehicle is launched. Any suitable launch process may be used. Typically, the launch vehicle is a rocket that combusts liquid or solid fuel in order to reach orbit. The launch vehicle may be launched from the Earth's surface, may be launched from an aerial launch platform, or using any other suitable technique.

At block 308, the monitoring device 204 of the spacecraft 202 receives signals from the sensor devices 206 of the spacecraft 202. Each signal separately indicates whether or not the given sensor device 206 detects a condition for activating the power-consuming systems 210. At decision block 210, the monitoring device 204 determines whether the signals from the sensor devices 206 collectively indicate that conditions exist for activating the power-consuming systems 210. As noted above, the monitoring device 204 may determine whether each signal from the sensor devices 206 indicates that the conditions exist, or whether at least a threshold number of signals indicate that the conditions exist.

If the monitoring device 204 determines that the signals do not collectively indicate that conditions exist for activating the power-consuming systems 210, then the result of decision block 310 is NO, and the method 300 returns to block 308. The method 300 may loop between decision block 310 and block 308 to monitor the signals at any suitable rate. In one non-limiting example, the method 300 may loop between decision block 310 and block 308 every 5 ms.

Otherwise, if the monitoring device 204 determines that the signals do collectively indicate that conditions exist for activating the power-consuming systems 210, then the result of decision block 310 is YES, and the method 300 proceeds to block 312, where the monitoring device 204 causes the one or more power-consuming systems 210 to enter an active state. The monitoring device 204 may do this using any suitable technique, including but not limited to by transmitting a wake up signal to the power-consuming systems 210 and/or by providing a main power supply to the power-consuming systems 210. For instance, the monitoring device 204 may direct power from the power storage device 208 to the power-consuming systems 210 (e.g., by flipping one or more switches).

At block 312, the spacecraft 202 is released from the launch vehicle. The spacecraft 202 may be released using any suitable technique, such as by passively deploying the spacecraft 202 from a stack of layered spacecrafts. In some embodiments, block 314 may occur before block 312, while in other embodiments, block 314 may occur after or concurrently with block 312. For example, in some circumstances, it may be beneficial for activation of the power-consuming systems 210 to occur before release from the launch vehicle so that the spacecraft 202 is prepared for independent flight as soon as it is released. Accordingly, the sensor devices 206 may be configured to detect an altitude lower than the final orbital altitude of the spacecraft 202. However, in other circumstances, it may be beneficial for activation of the power-consuming systems 210 to occur at or near the time the spacecraft 202 enters its intended orbit to reduce the amount of power stored within the power storage device 208. Accordingly, the sensor devices 206 may be configured to detect an altitude corresponding to the orbital altitude of the spacecraft 202. Further, as noted above, two or more of the power-consuming systems 210 may be activated at different times and/or altitudes.

Figure 4:
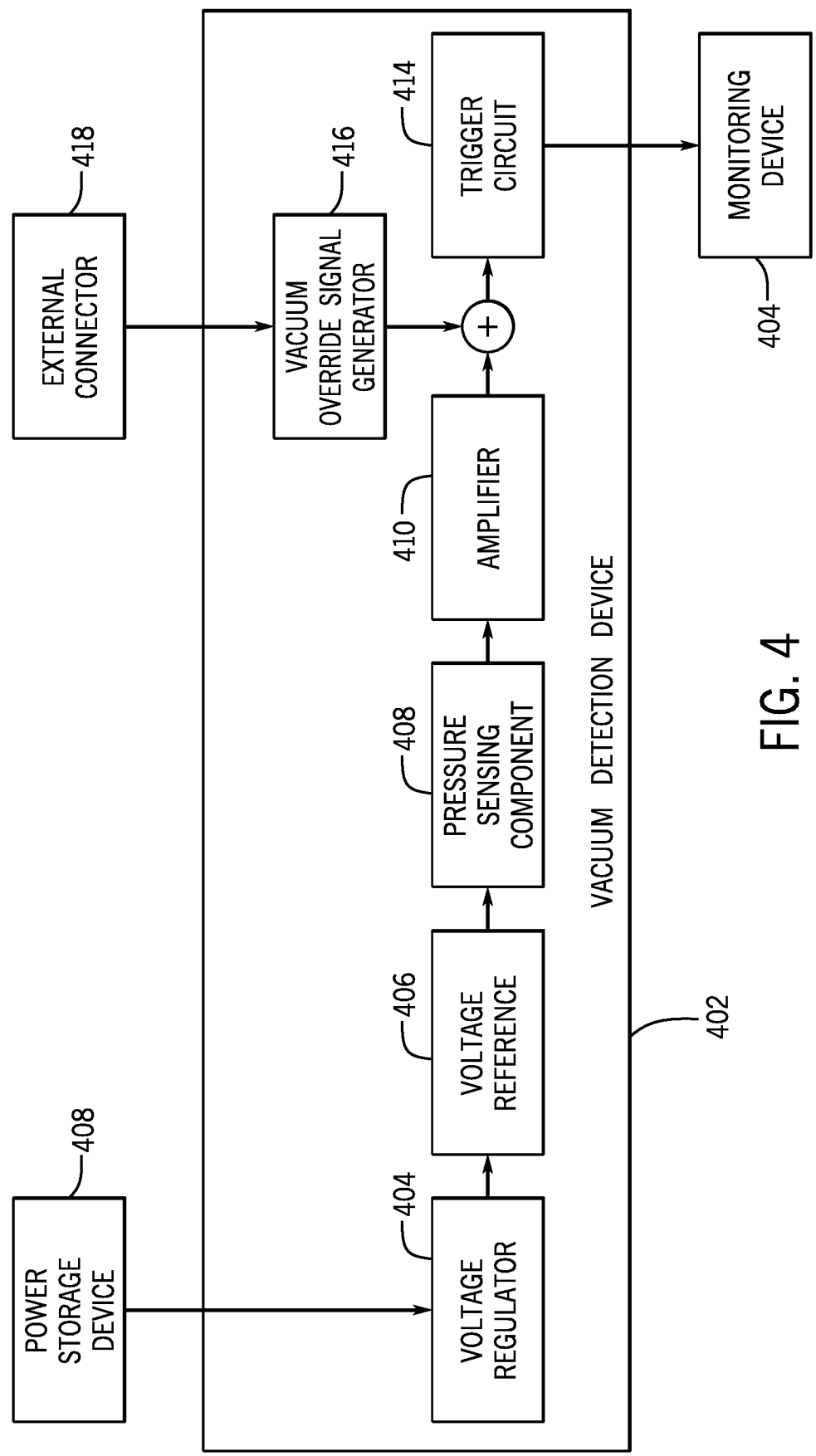
FIG. 4 is a block diagram that illustrates a non-limiting example embodiment of a vacuum detection device according to various aspects of the present disclosure.

FIG. 4 is a block diagram that illustrates a non-limiting example embodiment of a vacuum detection device according to various aspects of the present disclosure. The vacuum detection device 402 is one example of a sensor device 206 as discussed above. The vacuum detection device 402 has several features that make it suitable for use in spacecraft 202. For example, the vacuum detection device 402 is both reliable and can be assembled from low-cost components, thus reducing the overall complexity and cost of the spacecraft 202. As another example, the vacuum detection device 402 includes features that allow the actual sensed value to be overridden by an external command, thus allowing functionality that relies on the output of the vacuum detection device 402 to be tested without actually exposing a system that includes the vacuum detection device 402 to a vacuum.

As shown, the vacuum detection device 402 includes a voltage regulator 404, a voltage reference 406, a pressure sensing component 408, an amplifier 410, a trigger circuit 414, and a vacuum override signal generator 416. The voltage regulator 404 has an input that is coupled to an output of the power storage device 208, and receives power from the power storage device 208 via its input. The voltage regulator 404 is configured to automatically provide a substantially constant voltage level to its output, which is coupled to an input of the voltage reference 406. The voltage reference 406 is configured to produce a fixed voltage regardless of temperature, variations in the voltage supplied by the voltage regulator 404, and other factors. In some cases, the purpose of the voltage reference 406 may be to control or account for the variations in the voltage supplied by the voltage regulator 404. For instance, the voltage reference 406 may correct or remove any undesirable variations from the output of the voltage regulator 408. The voltage reference 406 provides the fixed voltage to its output, which is coupled to the input of the pressure sensing component 408.

The pressure sensing component 408 may be any type of component that, given a constant voltage input, produces a variable voltage output based on an ambient pressure. For instance, the output voltage of the pressure sensing component may have a fixed and/or predetermined correlation with ambient pressure. One non-limiting example embodiment of a pressure sensing component 408 is a strain gauge that includes a pressure-sensitive resistor. A strain gauge or pressure-sensitive resistor has benefits in that it is both inexpensive and highly resistant to radiation and other harsh environmental conditions. Some other non-limiting example embodiments of a pressure sensing component 408 are a piezoresistive pressure sensing device, a pressure sensitive capacitor, a piezoelectric pressure sensing device, and an optical pressure sensing device.

The output of the pressure sensing component 408 is coupled to an input of the amplifier 410, which amplifies the voltage into a usable range and provides the amplified voltage to an output of the amplifier 410. The amplifier 410 includes any type or form of amplifier, such as a voltage amplifier, a power amplifier, an operational amplifier, and a low-noise amplifier, among others. The output of the amplifier 410 is coupled to an input of the trigger circuit 414. The trigger circuit 414 is configured to output a binary value based on the voltage received at its input, such that if the input voltage is correlated to an ambient pressure sensed by the pressure sensing component 408 that is less than a threshold ambient pressure, the trigger circuit 414 will output a signal to the monitoring device 204 that indicates that a vacuum was detected. Otherwise, if the input voltage is not correlated to an ambient pressure sensed by the pressure sensing component 408 that is less than the threshold ambient pressure, the trigger circuit 414 will output a signal to the monitoring device 204 that indicates that a vacuum was not detected (or will output no signal). Though the signal is described as indicating that a vacuum was detected or not detected, in some embodiments, the trigger circuit 414 may be tuned such that the threshold ambient pressure is greater than hard vacuum. For example, in some embodiments, the trigger circuit 414 may be tuned to a threshold ambient pressure of one-third of an atmosphere. Such a threshold will eliminate false positives in any ground-based transportation of the spacecraft 202, while leaving enough of a margin to eliminate any false negatives and providing the monitoring device 204 time to react to the signal before orbit is reached.

As shown, the output of the amplifier 410 is combined with an output of a vacuum override signal generator 416. An input of the vacuum override signal generator 416 is coupled to an external connector 418, which may be an umbilical connector for ground-based operations, a data port such as a USB port or RJ-45 connector, a serial port, or any other type of external connector 418 capable of providing a command to the vacuum override signal generator 416. Upon receiving a command signal from the external connector 418 to simulate a vacuum, the vacuum override signal generator 416 outputs a voltage that matches a voltage that would be output by the amplifier 410 when the pressure sensing component 408 is exposed to vacuum (or at least to an ambient pressure that is below the threshold ambient pressure). This voltage is then received by the trigger circuit 414 as if it was generated by the amplifier 410 and pressure sensing component 408. This design allows ground-based testing of the functionality of the monitoring device 204 that is based on the signals produced by the vacuum detection device 402 without requiring that the vacuum detection device 402 actually be exposed to vacuum for the testing. This helps greatly reduce the cost and complexity of testing the assembled spacecraft 202 before launch.

While illustrative embodiments have been illustrated and described, it will be appreciated that various changes can be made therein without departing from the spirit and scope of the invention. For example, a simple combination of a single type of sensor device 206 and a single type of power-consuming system 210 may be implemented within the spacecraft 202. However, as discussed above, multiple different types of sensor devices 206 may be present on the spacecraft 202, and the monitoring device 204 may use signals from more than one type of sensor device 206 in its determination. For example, the monitoring device 204 may check to see if signals from different types of sensor devices 206 agree that the power-consuming systems 210 should be activated.

The embodiments of the invention in which an exclusive property or privilege is claimed are defined as follows:
1. A spacecraft, comprising:
  one or more power-consuming systems;
  one or more sensors; and a monitoring device configured to activate the one or more power-consuming systems based on signals received from the one or more sensors.

2. The spacecraft of claim 1, wherein each vacuum detection device includes a pressure sensing component that has an input coupled to a reference voltage source and is configured to generate an output voltage that varies based on an ambient pressure.

3. The spacecraft of claim 2, wherein the pressure sensing component includes at least one of a pressure sensitive resistor, a piezoresistive pressure sensing device, a pressure sensitive capacitor, a piezoelectric pressure sensing device, and an optical pressure sensing device.

4. The spacecraft of claim 2, wherein each vacuum detection device further includes a trigger circuit; wherein an output voltage of the pressure sensing component is provided to an input of the trigger circuit; and wherein the trigger circuit is configured to output a binary signal indicating a presence or absence of a vacuum based on the output voltage of the pressure sensing component.

5. The spacecraft of claim 4, wherein the output voltage of the pressure sensing component is provided to the input of the trigger circuit via an amplifier.

6. The spacecraft of claim 4, wherein outputting the binary signal based on the output voltage of the pressure sensing component includes outputting a signal that indicates a presence of a vacuum in response to receiving a voltage correlated to an ambient pressure of less than about one-third of an atmosphere, and outputting a signal that indicates an absence of a vacuum in response to receiving a voltage that is not correlated to an ambient pressure of less than about one-third of an atmosphere.

7. The spacecraft of claim 4, further comprising a vacuum override signal generator coupled to the input of the trigger circuit, wherein the vacuum override signal generator is configured to transmit a voltage correlated to an ambient pressure of less than about one-third of an atmosphere in response to receiving a command via an external connection.

8. The spacecraft of claim 1, wherein the one or more sensors includes at least one of a vacuum detection device, a contact switch, a vibration sensor, a wireless communication sensor, an optical sensor, and a spacecraft-to-spacecraft connectivity sensor.

9. The spacecraft of claim 1, wherein activating the one or more power-consuming systems based on signals received from the one or more sensors includes activating the one or more power-consuming systems in response to detecting that a majority of the signals received from the sensors indicate an activation condition.

10. The spacecraft of claim 1, wherein the one or more power-consuming systems includes a flight computer.

11. A method for autonomously activating power-consuming systems of a spacecraft, the method comprising: receiving, by a monitoring device of the spacecraft, at least one signal from at least one sensor of the spacecraft; determining, by the monitoring device, whether the at least one signal indicates an activation condition; and in response to determining that the at least one signal indicates an activation condition, activating, by the monitoring device, the power-consuming systems; and wherein the at least one sensor is a vacuum detection device.

12. The method of claim 11, wherein activating the power-consuming systems includes activating, by the monitoring device, a flight computer.

13. The method of claim 11, wherein receiving at least one signal from at least one sensor of the spacecraft includes receiving a plurality of signals from a plurality of sensors.

14. The method of claim 13, wherein determining whether the at least one signal indicates an activation condition includes determining whether a majority of the plurality of signals indicate an activation condition.

15. The method of claim 11, wherein determining whether the at least one signal indicates an activation condition includes determining whether the signal indicates that the vacuum detection device detects an ambient pressure that is below a pressure threshold.

16. The method of claim 15, wherein determining whether the signal indicates that the vacuum detection device detects an ambient pressure that is below a pressure threshold includes determining whether the signal indicates that the vacuum detection device detects an ambient pressure that is below one-third of an atmosphere.

17. A monitoring device for a spacecraft, wherein the monitoring device is configured to perform a method as recited in claim 11.

18. A method of launching a spacecraft into orbit, the method comprising: loading the spacecraft with one or more power-consuming devices of the spacecraft in an inactive state onto a launch vehicle; launching the launch vehicle; detecting, by the spacecraft, a condition for activating the power-consuming devices; activating, by the spacecraft, the one or more power-consuming devices; and releasing the spacecraft from the launch vehicle; and wherein the condition is detected by one or more sensors including one or more vacuum detection devices.

19. A spacecraft launch system, comprising: a launch vehicle; and at least one spacecraft removably attached to the launch vehicle, wherein the at least one spacecraft includes one or more power-consuming devices in an inactive state; wherein the one or more power-consuming devices of the at least one spacecraft are activated to an active state based on signals received from one or more sensors including one or more vacuum detection devices.

* * * * *